US012695969B2

(12) United States Patent
An et al.

(10) Patent No.: US 12,695,969 B2
(45) Date of Patent: Jul. 28, 2026

(54) CAMERA MODULE HAVING AN EDGE-DISPOSED SHIELDING PLATE AND ELECTRONIC DEVICE INCLUDING THE CAMERA MODULE

(71) Applicant: Samsung Electronics Co., Ltd., Suwon-si (KR)

(72) Inventors: Hyosang An, Suwon-si (KR); Hwajoong Jung, Suwon-si (KR); Beomsik Kim, Suwon-si (KR); Bongchan Kim, Suwon-si (KR); Taehwan Kim, Suwon-si (KR); Hyungjin Rho, Suwon-si (KR); Jaeheung Park, Suwon-si (KR); Kwangseok Byon, Suwon-si (KR); Jonghoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 18/752,312

(22) Filed: Jun. 24, 2024

(65) Prior Publication Data

US 2024/0348907 A1 Oct. 17, 2024

Related U.S. Application Data

(63) Continuation of application No. PCT/KR2022/019551, filed on Dec. 5, 2022.

(30) Foreign Application Priority Data

Jan. 18, 2022 (KR) ........................ 10-2022-0007319
Apr. 8, 2022 (KR) ........................ 10-2022-0043799

(51) Int. Cl.
*H04N 23/55* (2023.01)
*H04N 23/54* (2023.01)

(52) U.S. Cl.
CPC ............. *H04N 23/55* (2023.01); *H04N 23/54* (2023.01)

(58) Field of Classification Search
CPC ........ H04N 23/55; H04N 23/54; H04N 23/57; H10F 39/804; H10F 39/806
See application file for complete search history.

(56) References Cited

U.S. PATENT DOCUMENTS 9,241,097 B1 * 1/2016 Tam ...................... H10F 39/804
10,701,250 B2 6/2020 Jarvis et al.
(Continued)

FOREIGN PATENT DOCUMENTS

CN 107682591 A 2/2018
CN 110708454 A 1/2020
(Continued)

OTHER PUBLICATIONS

Extended European Search Report for EP Application No. 22830118.0 dated Jun. 13, 2024, 10 pages.
(Continued)

*Primary Examiner* — Padma Haliyur
(74) *Attorney, Agent, or Firm* — Nixon & Vanderhye P.C.

(57) ABSTRACT

A camera module according to various embodiments of the disclosure may include: an image sensor (140); a substrate (110) electrically connected to the image sensor (140); a bracket (120) configured to fix the substrate (110); and a plate (130) disposed on the bracket (120) such that the width (131) of a surface of the plate (130) facing the image sensor (140) includes the width (141) of an area in which the image sensor (140) is disposed, thereby shielding at least a part of a space in which the image sensor (140) is disposed from the outside, wherein the bracket (120) may be formed by injection molding a material forming the bracket (120) in a state in which the plate (130) is inserted into a mold. Various
(Continued)

other embodiments inferable from the specification are also possible.

19 Claims, 13 Drawing Sheets

(56) References Cited

U.S. PATENT DOCUMENTS

| 10,965,855 | B2 | 3/2021 | Chen et al. | |
| 2011/0134306 | A1 | 6/2011 | Kim et al. | |
| 2015/0281532 | A1 | 10/2015 | Yu et al. | |
| 2017/0013178 | A1 | 1/2017 | Woo et al. | |
| 2018/0020208 | A1 | 1/2018 | Woo et al. | |
| 2019/0058814 | A1 | 2/2019 | Jung et al. | |
| 2019/0068846 | A1 | 2/2019 | Jung et al. | |
| 2019/0394366 | A1 | 12/2019 | Li et al. | |
| 2020/0178411 | A1 | 6/2020 | Pham et al. | |
| 2021/0074750 | A1* | 3/2021 | Gu | H10F 39/8063 |
| 2021/0313366 | A1 | 10/2021 | Yajima et al. | |
| 2022/0155418 | A1 | 5/2022 | Han et al. | |
| 2022/0190015 | A1* | 6/2022 | Baik | H04N 25/00 |
| 2023/0199284 | A1* | 6/2023 | Park | H04N 23/55 |
| | | | | 348/207.99 |
| 2023/0217106 | A1 | 7/2023 | Park | |
| 2024/0004265 | A1* | 1/2024 | Liu | H04N 23/54 |
| 2025/0071405 | A1* | 2/2025 | Son | H04N 23/51 |

FOREIGN PATENT DOCUMENTS

| CN | 211959342 | U | * | 11/2020 | ............ H04N 23/51 |
| CN | 113132584 | A | | 7/2021 | |
| CN | 213718044 | U | | 7/2021 | |
| KR | 20080028588 | A | | 4/2008 | |
| KR | 20110063096 | A | | 6/2011 | |
| KR | 20130015293 | A | | 2/2013 | |
| KR | 20150066813 | A | | 6/2015 | |
| KR | 101848871 | B1 | | 4/2018 | |
| KR | 101914542 | B1 | | 12/2018 | |
| KR | 10-2019-0004455 | A | | 1/2019 | |
| KR | 20190020533 | A | | 3/2019 | |
| KR | 102108520 | B1 | | 5/2020 | |
| KR | 20200066407 | A | | 6/2020 | |
| KR | 20200101240 | A | | 8/2020 | |
| WO | WO-2020180078 | A1 | * | 9/2020 | ............ H04N 25/00 |
| WO | 2020204327 | A1 | | 10/2020 | |
| WO | 2021256819 | A1 | | 12/2021 | |
| WO | WO-2021256712 | A1 | * | 12/2021 | ............ H04N 23/55 |
| WO | WO-2022111263 | A1 | * | 6/2022 | .......... H04N 23/685 |

OTHER PUBLICATIONS

International Search Report for PCT/KR2022/019551 dated Mar. 20, 2023, 6 pages.
Written Opinion of the ISA for PCT/KR2022/019551 dated Mar. 20, 2023, 4 pages.
Indian Office Action dated Jan. 19, 2026 issued in Indian Patent Application No. 202417049034 and English translation, 7 pp.

* cited by examiner

CAMERA MODULE HAVING AN EDGE-DISPOSED SHIELDING PLATE AND ELECTRONIC DEVICE INCLUDING THE CAMERA MODULE

TECHNICAL FIELD

Various embodiments disclosed herein relate to a camera module and, more particularly, to a structure of a sensor package included in the camera module.

BACKGROUND ART

Nowadays, as portable terminals including cameras, such as mobile phones and tablet PCs, have become common, the need for improving the resolution of the camera and reducing the size of the camera is increasing. Related technology research is being actively conducted, and camera-related technologies are becoming more and more advanced.

An IR filter bracket configured to support an IR filter included in a sensor package constituting a camera module may be manufactured by injection molding through a bracket frame by using a mold. The sensor package may be formed by attaching a substrate on which an image sensor is mounted to a bracket configured to support the IR filter. The image sensor may be disposed in a space closed by the IR filter, the bracket, and the substrate so as to be shielded from an external space.

DISCLOSURE

Technical Problem

Since there is a limit in reducing the thickness of a bracket in a rib structure of the bracket injection molded using a mold, there is also a limit in reducing the size of a camera module. As a result, there may be a limit in reducing the amount by which a camera lens protrudes relative to the height of a barrel.

In addition, in order to attach a circuit board to the bracket, a structure for bonding the circuit board and the bracket is required.

Technical Solution

According to various embodiments disclosed herein, a camera module includes: an image sensor; a substrate electrically connected to the image sensor; a bracket configured to fix the substrate; and a plate disposed on the bracket such that the width of a surface of the plate facing the image sensor includes the width of an area in which the image sensor is disposed, thereby shielding at least a part of a space in which the image sensor is disposed from the outside.

According to various embodiments disclosed herein, a method for manufacturing a camera module includes: producing a bracket including a plate disposed such that the width of the surface of the plate facing an image sensor includes the width of an area in which the image sensor is disposed; a first bonding in which the produced bracket and the substrate electrically connected to the image sensor are bonded to each other by an adhesive; and second bonding in which a spacing gap between the coupled plate and the substrate is bonded by an adhesive.

According to various embodiments disclosed herein, an electronic device includes: a housing configured to form an inner space; at least one electronic component disposed in the inner space; and a camera module disposed in the inner space, wherein the camera module may include: an image sensor; a substrate electrically connected to the image sensor; a bracket configured to fix the substrate; and a plate disposed on the bracket such that the width of a surface of the plate facing the image sensor includes the width of an area in which the image sensor is disposed, thereby shielding at least a part of a space in which the image sensor is disposed from the outside.

Advantageous Effects

Various embodiments disclosed herein may provide a camera module and an electronic device including the camera module, wherein the camera module has a reduced size and thus lowers the height of the optical axis of light entering through a lens.

Various embodiments may provide a camera module and an electronic device including the camera module, wherein the degree by which a barrel including a camera lens in the camera module protrudes out of a device including the camera module may be reduced. In addition, various embodiments may provide a camera module and an electronic device including the camera module, wherein the shoulder height, i.e., the height of the camera module excluding the barrel in the camera module may be reduced. According to various embodiments, a space in which an image sensor or a bonding pad configured to electrically connect the image sensor is disposed may be further secured on a substrate.

In addition, according to various embodiments, a plate may be coupled to the substrate through an adhesive and thus may shield the periphery of the image sensor from the outside.

Advantageous effects obtainable from the disclosure may not be limited to the above-mentioned effects, and other effects which are not mentioned may be clearly understood, through the following descriptions, by those skilled in the art to which the disclosure pertains.

Various other effects understood directly or indirectly through the present document may be provided.

DESCRIPTION OF DRAWINGS

In connection with the description of the drawings, the same or similar reference numerals may be used for the same or similar components.

MODE FOR INVENTION

Figure 1:
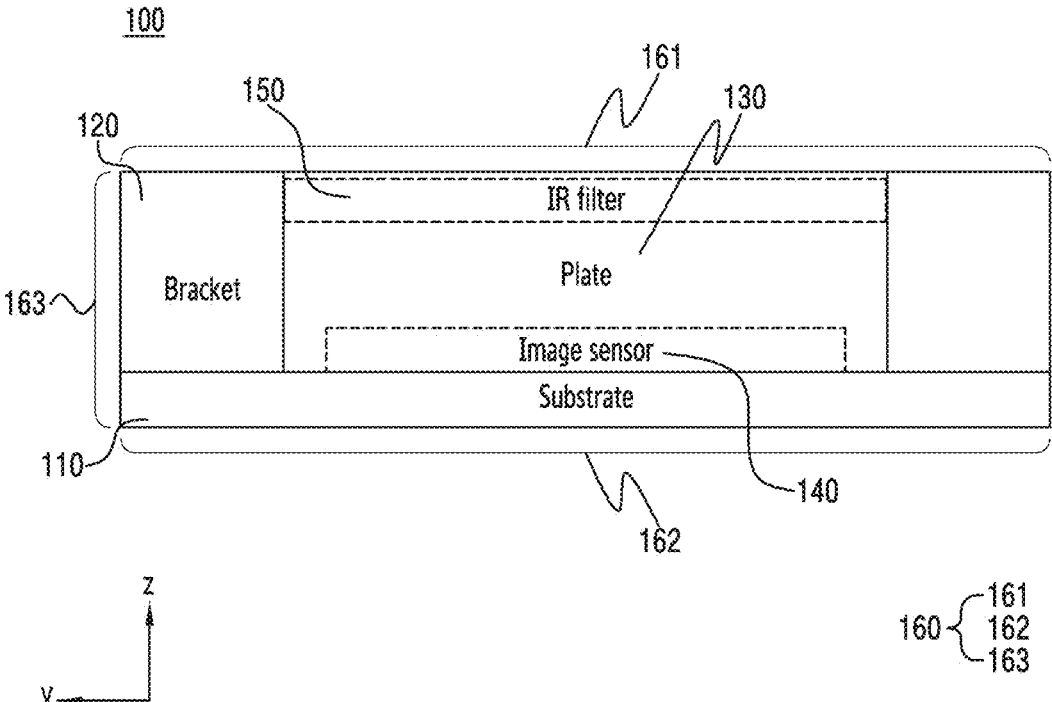
FIG. 1 illustrates a structure of a sensor package of a camera module according to an embodiment.

Hereinafter, various embodiments of the disclosure will be described with reference to the accompanying drawings. However, it should be appreciated that they are not intended to limit the disclosure to specific embodiments, and include various modifications, equivalents, and/or alternatives of embodiments of the disclosure.

With regard to the description of the drawings, similar reference numerals may be used to designate similar or relevant elements.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", "at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and do not limit the corresponding elements.

The terms used in the disclosure are only used to describe specific embodiments, and may not be intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

FIG. 1 illustrates a structure of a sensor package 100 of a camera module according to an embodiment.

Referring to FIG. 1, the sensor package 100 of a camera module according to an embodiment includes a substrate 110, a bracket 120, a plate 130, an image sensor 140, and an IR filter 150. However, the sensor package 100 is not limited thereto. For example, the sensor package 100 may include additional components in addition to the components shown in FIG. 1. For another example, in the sensor package 100, some of the components shown in FIG. 1 may be replaced with other components, or some may be omitted. For example, the IR filter 150 may be omitted, for example to be disposed in another structure outside the sensor package 100, or may be replaced with other components.

According to an embodiment, the IR filter 150 may be disposed in the center part of the bracket 120. In addition, the image sensor 140 may be disposed in the center part of the substrate 110. In an example, the sensor package 100 may be disposed such that the IR filter 150 and the image sensor 140 face each other.

According to an embodiment, the sensor package 100 may include a first surface 161 on which the IR filter 150 and the bracket 120 are disposed, and a second surface 162 on which the substrate 110 is disposed. The first surface 161 may be opposite and/or in parallel to the second surface 162. The sensor package 100 may further include a lateral surface 163 between the first surface 161 and the second surface 162.

According to an embodiment, the IR filter 150 and/or at least one plate 130 may be disposed on the bracket 120. The plate 130 may be coupled to at least a part of the bracket 120. For example, the bracket 120 may be coupled to the plate 130 to be parallel in the longitudinal direction thereof. The longitudinal direction of the bracket 120 may mean a direction (e.g., the y-axis direction) indicating the longer side of the bracket 120 with respect to the plane on which the substrate 110 is disposed (e.g., the y-z plane in FIG. 2). In addition, when the plate 130 is coupled to the bracket 120 to be parallel in the longitudinal direction of the bracket 120, it may mean that the surface of the plate 130 forming the outer surface of the sensor package 100 is disposed parallel to the longitudinal direction of the bracket 120.

According to an embodiment, the image sensor 140 electrically connected to the substrate 110 may be disposed on the substrate 110. In an example, the image sensor 140 may be disposed in a space surrounded by the bracket 120, the IR filter 150, the plate 130, and the substrate 110. The image sensor 140 may detect light incident to the image sensor 140 through the IR filter 150.

According to an embodiment, the plate 130 may be disposed along at least a part of an edge of the substrate 110. In an example, the plate 130 may be disposed to cover at least a part of the substrate 110. The lateral part of the substrate 110 may be a surface of the substrate 110 being orthogonal to the second surface 162 of the sensor package 100.

According to an embodiment, the plate 130 may be coupled to the substrate 110 by an adhesive. In an example, the plate 130 coupled to the substrate 110 by the adhesive may shield the image sensor 140 disposed on the substrate 110 from an external space. For example, the adhesive may include an epoxy resin or a non-conductive adhesive. In another example, the coupling may be performed using a conductive adhesive. In this case, the conductive adhesive may include silver-epoxy or solder paste. The plate 130 according to an embodiment may be formed of a material having rigidity while being easily formed to a thin thickness. For example, the plate 130 may be a metal plate including a metal material. The metal material may include, for example, steel use stainless (SUS). Metal material such as SUS can be easily produced very thinly while still being sufficient rigid in terms of stability. However, the disclosure is not limited thereto.

According to an embodiment, the bracket 120 may be coupled to the substrate 110 by an adhesive. In an example, the bracket 120 may include a first bonding area (321 in FIG.

3) bonded to the substrate 110, and a second bonding area (322 in FIG. 3) spaced apart from the first bonding area 321.

According to an embodiment, the plate 130 may enable the sensor package 100 to have a thickness thinner than the thickness of the sensor package 100 obtained by injection molding the entire bracket 120 by using a mold. The plate 130 according to an embodiment may form a structure capable of reducing the size of the sensor package 100 without overlapping with the image sensor 140 or the IR filter 150.

When the sensor package 100 is included in the camera module, the optical axis height (for example, 930 in FIG. 9) of light passing through a reflective member (e.g., a prism) that converts the optical path of light entering the camera module may be lowered. Accordingly, the height (e.g., 910 in FIG. 9) of the lens module for receiving light entering the camera module may be lowered.

According to another embodiment, the plate 130 may shield at least a part of the space in which the image sensor 140 on the substrate 110 is disposed from the outside, so that the image sensor 140 may receive only a light signal having passed through the IR filter 150.

Figure 2:
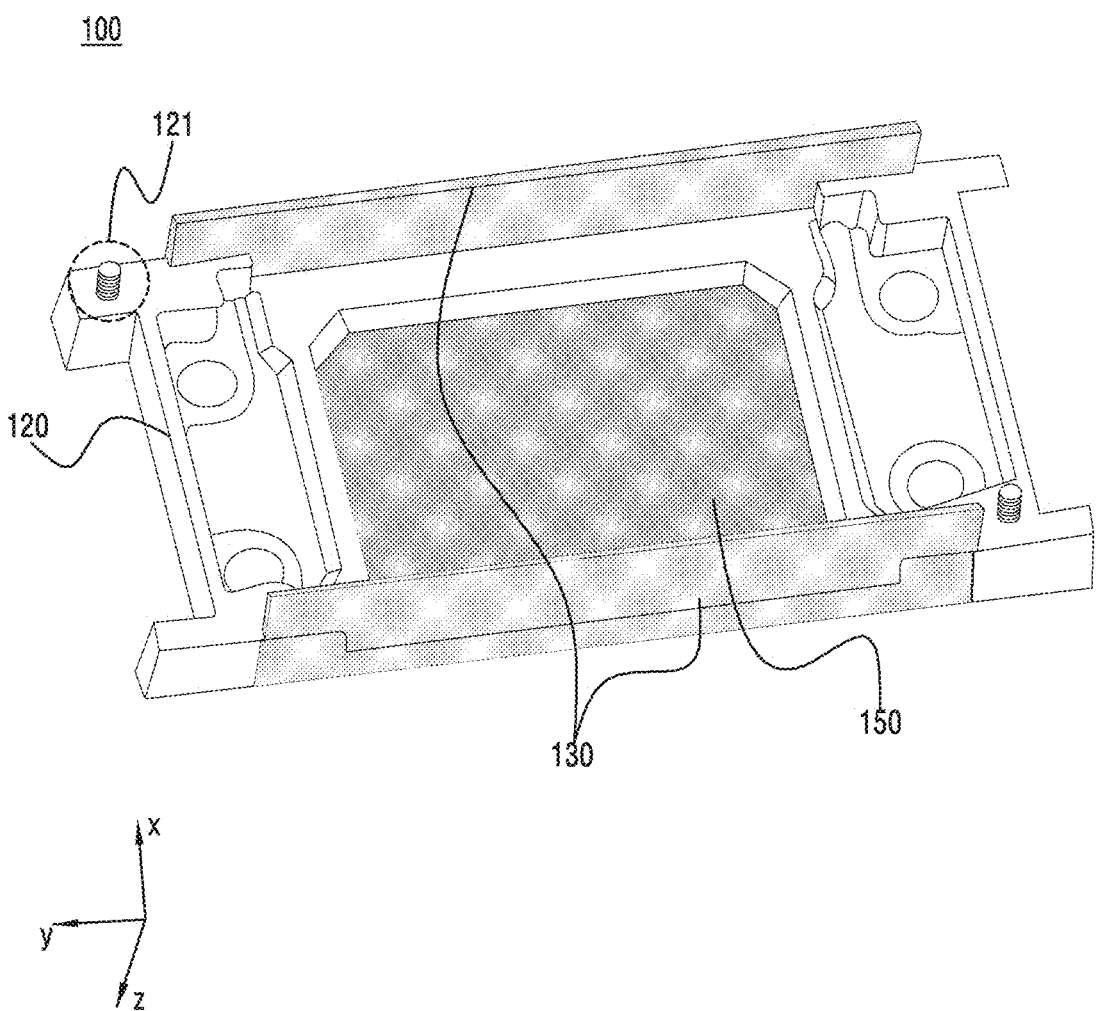
FIG. 2 is a perspective view illustrating a structure of a bracket included in a camera module according to an embodiment.

FIG. 2 is a perspective view illustrating a structure of the bracket 120 included in a camera module according to an embodiment.

Referring to FIG. 2, the IR filter 150 may be disposed at the center part of the bracket 120. The edge of the IR filter 150 may be connected to the bracket 120.

According to an embodiment, the bracket 120 may include at least one protrusion 121. The protrusion 121 may be inserted into a hole (510 in FIG. 5) on the substrate 110 corresponding to the position of the protrusion 121 to couple the bracket 120 and the substrate 110 to each other. The protrusion 121 helps to couple the bracket 120 and the substrate 110 during manufacturing of the sensor package 100. In an example, the protrusion 121 may have a cylindrical shape. However, the shape of the protrusion 121 is not limited thereto.

According to an embodiment, the at least one plate 130 may be disposed on the bracket 120 along a length including the width of at least one of an area where the IR filter 150 is disposed or an area where the image sensor 140 is disposed. The width of the at least one plate 130 may be to secure a space for accommodating the components included in the sensor package 100, and according to another embodiment, the width of the at least one plate 130 may be determined based on the sizes of other components.

According to an embodiment, the bracket 120 may be formed by insert injection molding. For example, the bracket 120 may be formed by injection molding a material forming the bracket 120 in a state in which at least one plate 130 is inserted into a mold. Based on the insert injection molding, coupling force between the plate 130 and other components of the bracket 120 may be secured.

According to an embodiment, the bracket 120 formed by insert injection molding may be integrally connected to a part in contact with the plate 130. The part where the bracket 120 and the plate 130 are in contact may shield at least a part of a space in which the image sensor 140 is disposed from the outside. However, the disclosure is not limited thereto. According to another embodiment, the coupling method between the bracket 120 and the plate 130 may be changed.

In this document, an embodiment in which two plates 130 are disposed on one side and an opposite side, that is one plate 130 per side, of the bracket 120 is illustrated, but the number of plates 130 is not limited thereto. For example, the sensor package 100 may include one plate 130 or more than two plates 130.

Figure 3:
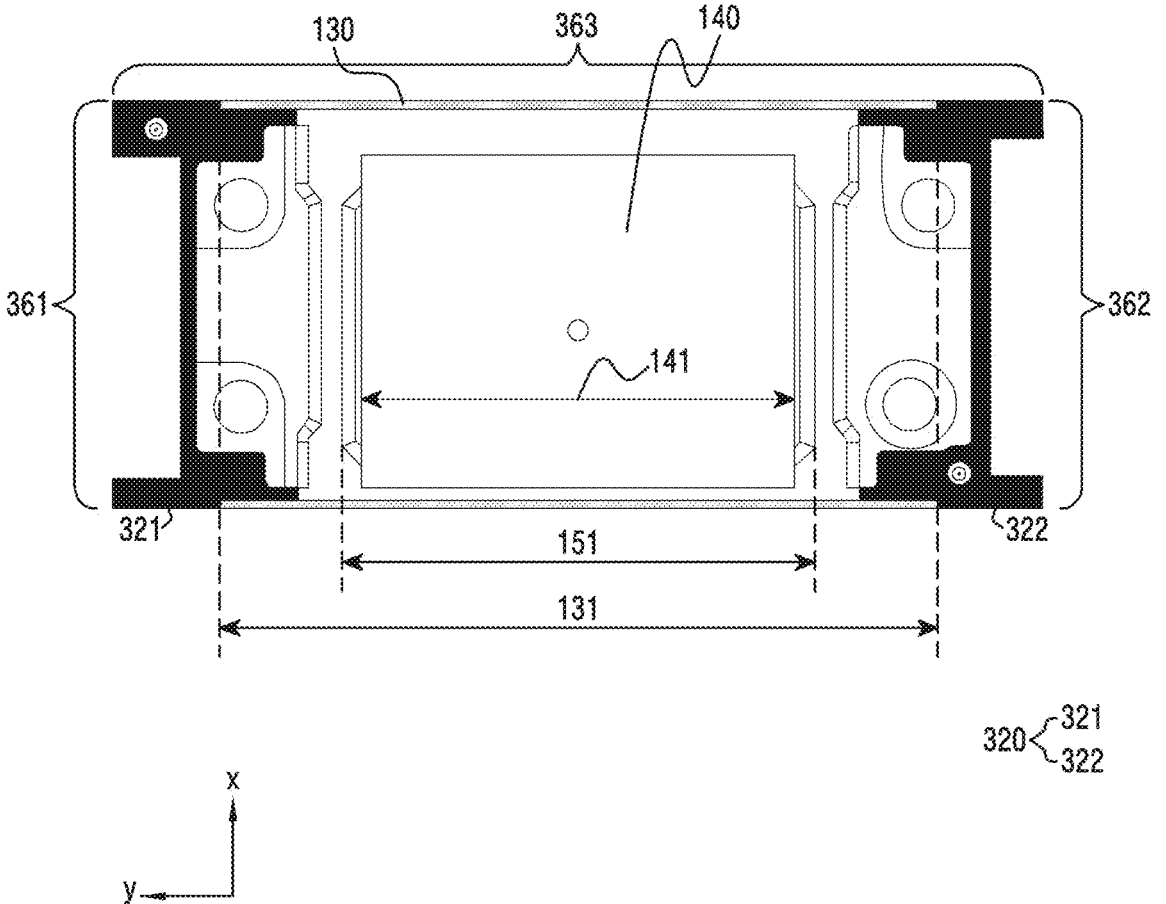
FIG. 3 is a plan view illustrating a structure in which an image sensor is disposed on a bracket included in a camera module according to an embodiment.

FIG. 3 is a plan view illustrating a structure in which an image sensor 140 is disposed on a bracket 120 included in a camera module according to an embodiment.

Referring to FIG. 3, the bracket 120 may include a bonding area 320 in which the same is coupled to the substrate 110. The bonding area 320 may include a first bonding area 321 and a second bonding area 322. In an example, the first bonding area 321 and/or the second bonding area 322 may include an area in which an adhesive for bonding the substrate 110 is applied. In another example, the second bonding area 322 may include an area spaced apart from the first bonding area 321. Having the bonding areas on opposite sides of the bracket 120 improves the overall bonding effect.

According to an embodiment, the first bonding area 321 and/or the second bonding area 322 of the bracket 120 may be coupled to the substrate 110 by using an adhesive. For example, the bracket 120 may have the first bonding area 321 and/or the second bonding area 322 to which the adhesive is applied and may be coupled to the substrate 110.

According to an embodiment, the image sensor 140 may be disposed in a space formed between the bracket 120 and the substrate 110 through the coupling of the bracket 120 and the substrate 110. The image sensor 140 may be mounted on one surface of the substrate 110.

According to an embodiment, the lateral surface (163 in FIG. 1) of the sensor package 100 may include a first lateral surface 361 forming the first bonding area 321, a second lateral surface 362 forming the second bonding area 322 opposite to the first bonding area 321, and a third lateral surface 363 formed by the plate 130. The lateral surface (163 in FIG. 1) of the sensor package 100 may also include a fourth lateral surface formed by another plate opposite to the third lateral surface 363 formed by the plate 130.

According to an embodiment, the plate 130 may be disposed on the bracket 120 such that the width 131 of the surface thereof facing the image sensor 140 and/or the IR filter 150 includes at least one of the width 141 of the area in which the image sensor 140 is disposed and/or the width 151 of the area in which the IR filter 150 is disposed. In other words, the width 131 of the surface of the plate 130 may be bigger than at least one of the width 141 of the area in which the image sensor 140 is disposed and/or the width 151 of the area in which the IR filter 150 is disposed.

According to an embodiment, the plate 130 may be disposed on the bracket 120 to shield at least a part of the space in which the image sensor 140 is disposed from the outside. That is, the plate 130 may be configured to shield at least a part of the space in which the image sensor 140 is disposed from the outside. Since it is easy to make the plate 130 thinner than a rib of the bracket 120 injection molded using a mold, the sensor package 100 including the plate 130 easily secures a space for accommodating at least one of the IR filter 150 or the image sensor 140.

Figure 4:
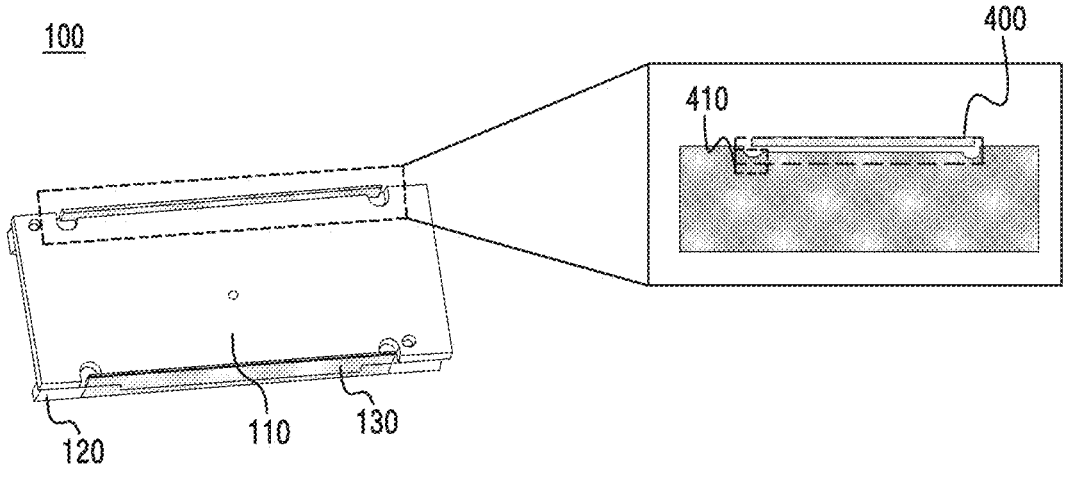
FIG. 4 is a perspective view illustrating a bonding area for bonding a substrate to a bracket of a camera module according to an embodiment.
Figure 4:
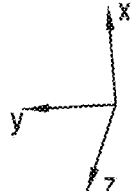

FIG. 4 is a perspective view illustrating a bonding area for bonding the bracket 120 to the substrate 110 of the camera module according to an embodiment.

Referring to FIG. 4, the camera module may include a third bonding area 400 for bonding the bracket 120 and the substrate 110 to each other. According to an embodiment, the third bonding area 400 may include a gap spacing between the plate 130 and the substrate 110. Accordingly, at least a part of the edge of the substrate 110 corresponding to the third lateral surface (363 in FIG. 3) may include a shape forming the third bonding area.

According to an embodiment, the substrate 110 may include at least one groove shape 410 formed to be disposed between the plate 130 and the substrate 110. The groove shape 410 may include a curved shape such that at least a partial area of the substrate 110 is away from the plate 130. The curved shape may be formed in various shapes. For example, the curved shape may be a shape including at least one of a semicircle or an ellipse.

According to an embodiment, the third bonding area 400 may include an area in which an adhesive (e.g., 520 in FIG. 5) is applied to the at least one groove shape 410. The substrate 110 may include two groove shapes 410 arranged on opposite ends along the longitudinal direction of the third bonding area 400.

According to an embodiment, the sensor package 100 may include the bracket 120, the substrate 110, and the plate 130 which are coupled to one another by applying an adhesive to a first bonding area (321 in FIG. 3), a second bonding area (322 in FIG. 3), and the third bonding area 400. However, the disclosure is not limited thereto.

According to an embodiment, the plate 130 included in the sensor package 100 may shield at least a part of a space in which the image sensor 140 electrically connected onto the substrate 110 is disposed from the outside.

Figure 5:
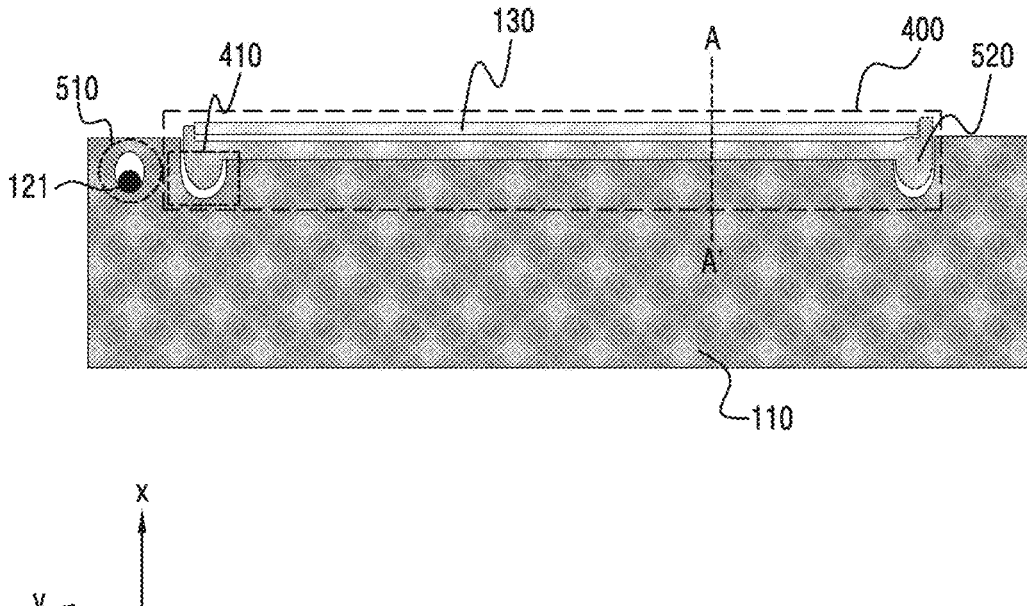
FIG. 5 is a plan view illustrating a bonding area according to an embodiment.

FIG. 5 is a plan view illustrating a bonding area, according to an embodiment.

Referring to FIG. 5, when the bracket 120 and the substrate 110 are coupled to each other, the third bonding area 400 may include a spaced area between the substrate 110 and the plate 130 which is coupled to the substrate 110 and the bracket 120 while being disposed therebetween. The third bonding area 400 may include an area in which an adhesive is applied to at least a part thereof.

According to an embodiment, the substrate 110 may include at least one hole 510 into which the protrusion 121 of the bracket 120 is inserted. The hole 510 on the substrate 110 may be coupled to the protrusion 121 of the bracket 120 at a position corresponding to the hole 510, thereby coupling the substrate 110 and the bracket 120 to each other. In an example, the hole 510 may include a circular hole shape, and may include other shapes. The hole 510 on the substrate 110 may be coupled to the protrusion 121 of the bracket 120 to fix the position of the substrate 110 or the bracket 120. In addition, the hole 510 on the substrate 110 may further secure a bonding force between the substrate 110 and the bracket 120.

Figure 6:
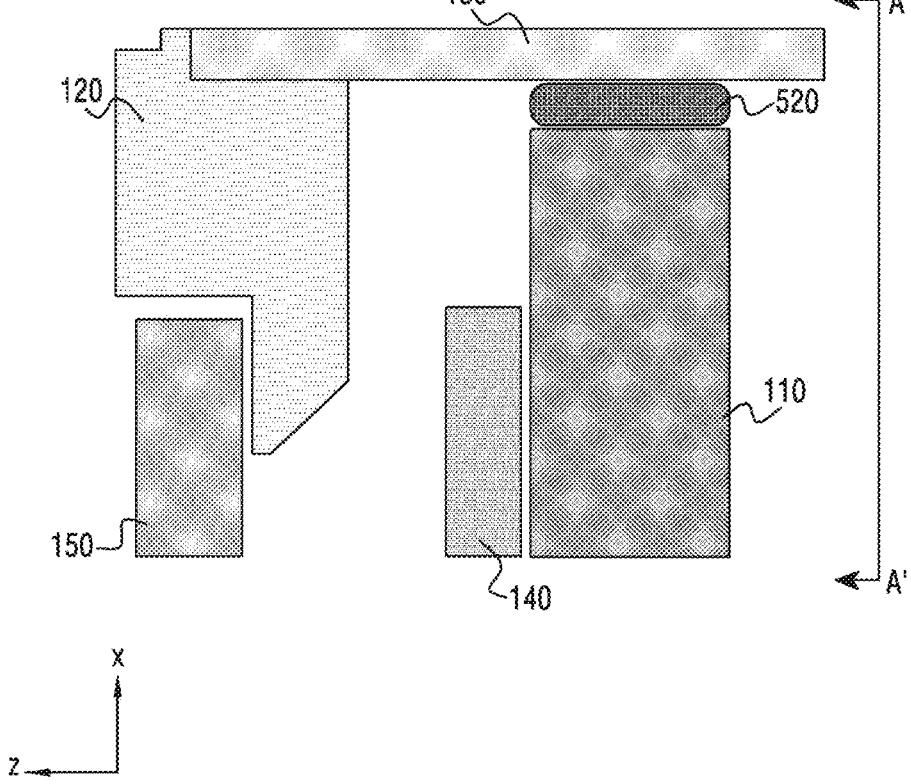
FIG. 6 illustrates a cross-sectional view of line A-A' in FIG. 5, according to an embodiment.

FIG. 6 illustrates a cross-sectional view of line A-A' in FIG. 5, according to an embodiment.

Referring to FIG. 6, the third bonding area 400 may include an area in which the adhesive 520 is applied in a gap between the substrate 110 and the plate 130. The area in which the adhesive 520 is applied may include an area in which the plate 130 is adjacent to the substrate 110. For example, the third bonding area 400 may include an area in which the adhesive 520 is applied to at least one groove shape (410 in FIG. 4) on the substrate 110.

According to an embodiment, the coupled third bonding area 400 may shield the image sensor 140 disposed in the space formed between the IR filter 150, the bracket 120, the plate 130, and the substrate 110 from the outside.

Figure 7:
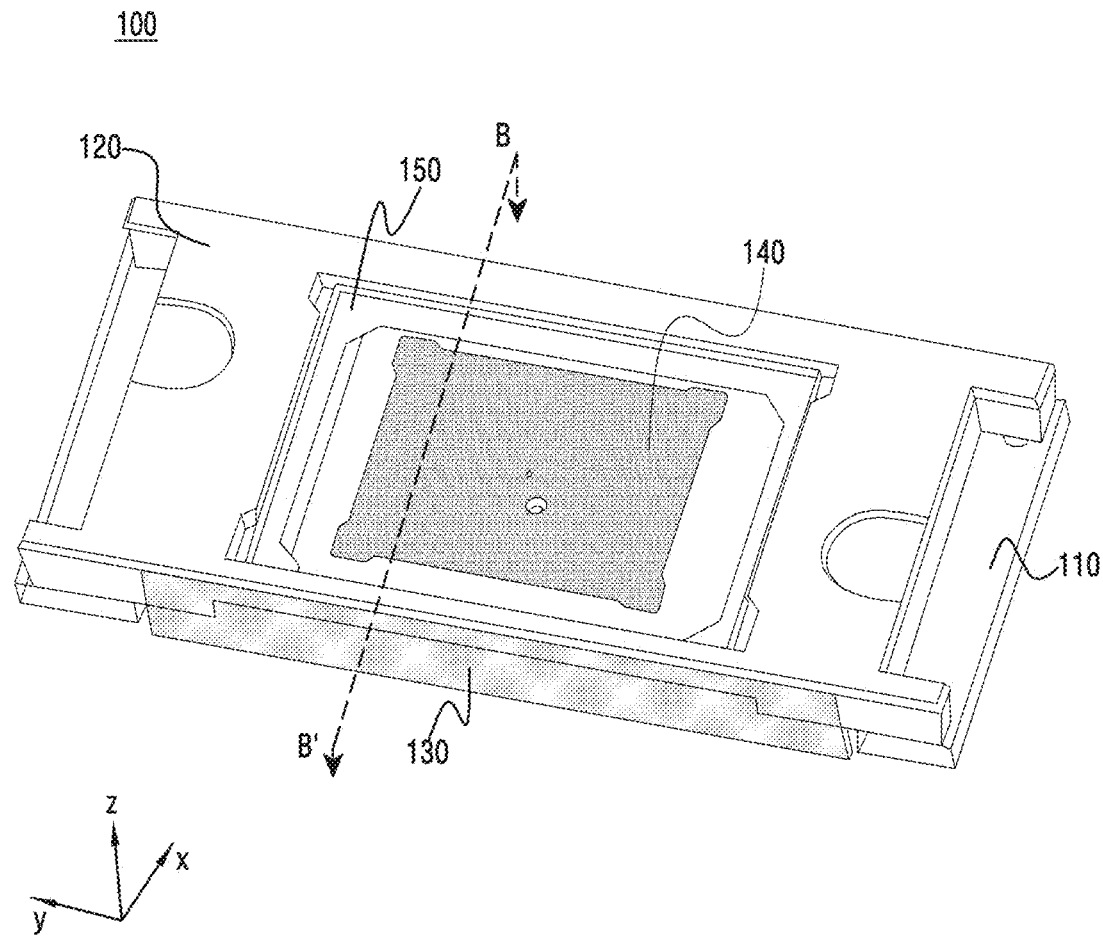
FIG. 7 is a perspective view illustrating a sensor package of a camera module according to an embodiment.

FIG. 7 is a perspective view illustrating the sensor package 100 of a camera module according to an embodiment.

Referring to FIG. 7, the IR filter 150 may be disposed on the bracket 120, and the image sensor 140 may be disposed on the substrate 110. According to an embodiment, the IR filter 150 and the image sensor 140 may be disposed to face each other.

According to an embodiment, the plate 130 may be disposed in at least one space between the bracket 120 and the substrate 110. For example, the plate 130 may be disposed such that the width of the surface thereof (131 in FIG. 3) facing the IR filter 150 and the image sensor 140 includes at least one of the width (141 in FIG. 3) of the IR filter 150 and the image sensor 140 or the width (151 in FIG. 3) of the area in which the IR filter 150 is disposed.

Figure 8:
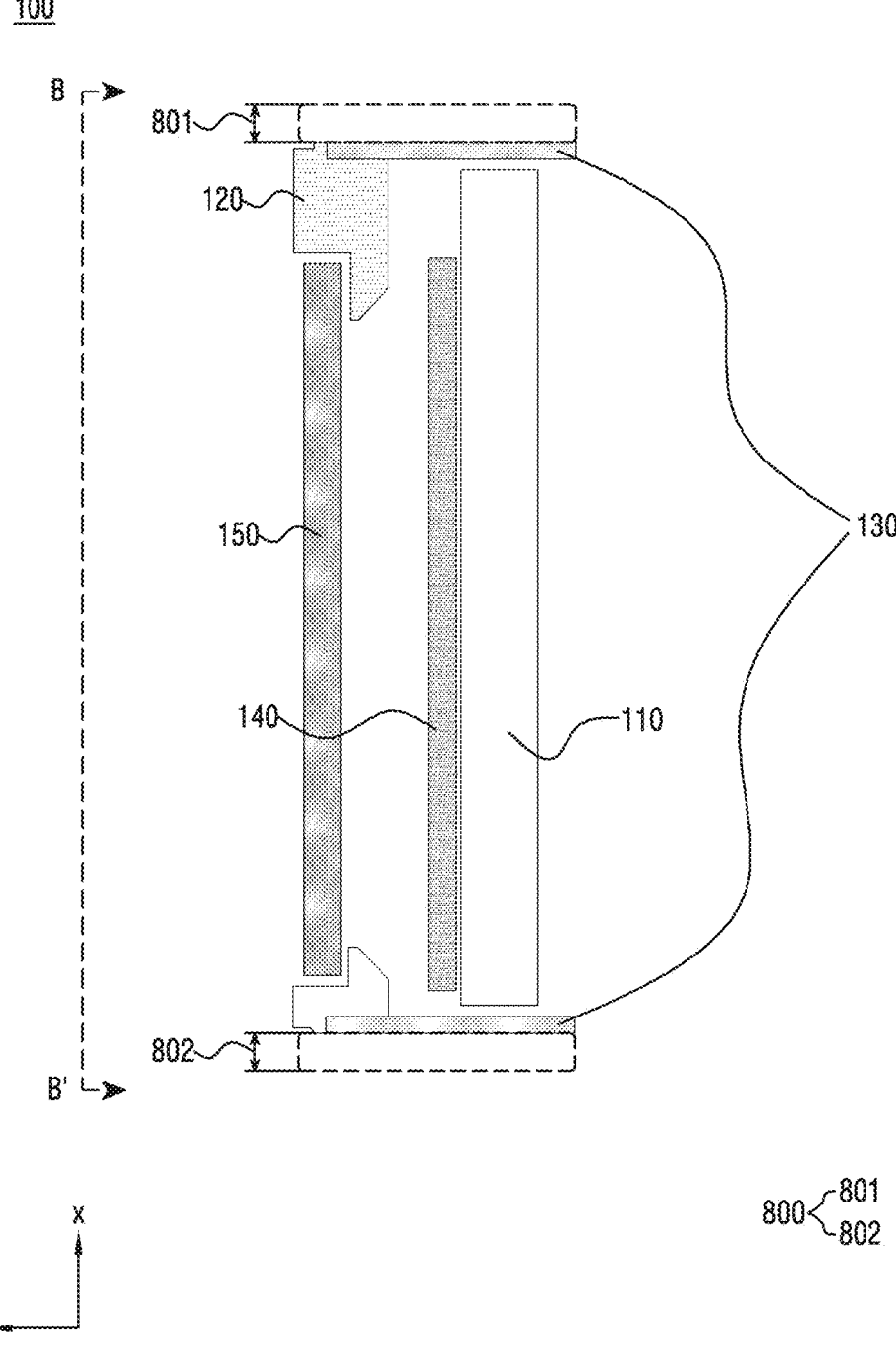
FIG. 8 illustrates a cross-sectional view of line B-B' of the sensor package shown in FIG. 7, according to an embodiment.

FIG. 8 illustrates a cross-sectional view of line B-B' of the sensor package 100 shown in FIG. 7, according to an embodiment.

Referring to FIG. 8, the plate 130 may be disposed on at least one of the lateral surfaces (e.g., the lateral surface 163 of FIG. 1) of the sensor package 100.

According to an embodiment, the height of the sensor package 100 may be lowered by the height difference 800 of the thickness of rib formed by the bracket 120 by a mold and the bracket 120 formed by injection molding in a state in which the plate 130 as much as the difference from the thickness of the plate 130. In an example, the height difference 800 may be regarded as a first height difference 801 or a second height difference 802.

Figure 9:
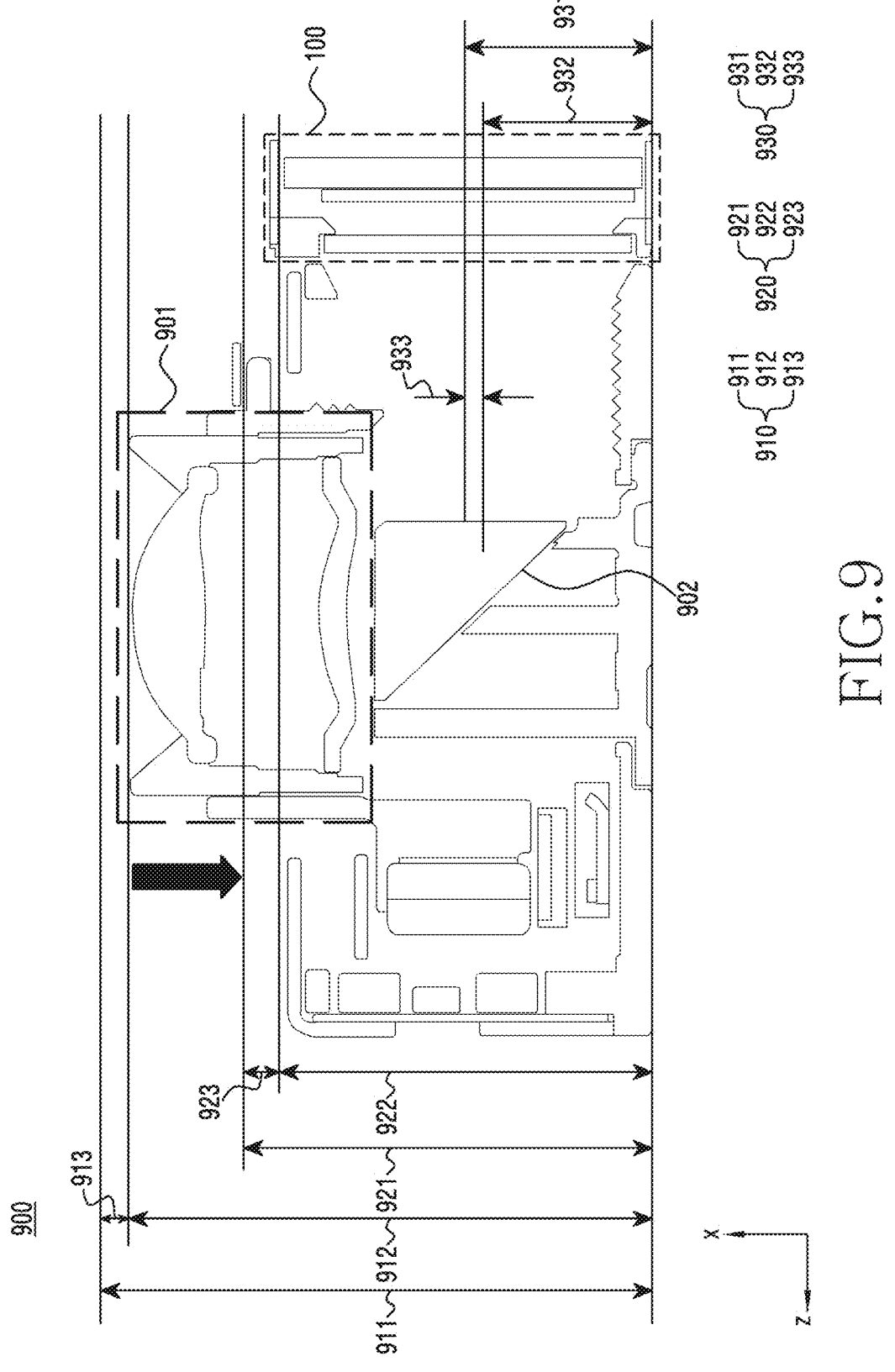
FIG. 9 is a cross-sectional view illustrating a structure of a refraction-type camera module according to an embodiment.

FIG. 9 is a cross-sectional view illustrating a structure of a refraction-type camera module 900 according to an embodiment.

Referring to FIG. 9, the refraction-type camera module 900 may include a lens module 901, a prism 902, and a sensor package 100. However, the disclosure is not limited thereto. For example, the refraction-type camera module 900 may include additional components in addition to the components shown in FIG. 9. For another example, in the refraction-type camera module 900, some of the components shown in FIG. 9 may be replaced with other components, or some may be omitted.

According to an embodiment, the light entering through the lens module 901 may have an optical path converted by the prism 902, and the light, the optical path of which have been converted, may pass through the IR filter 150 in the sensor package 100.

A height at which the sensor package 100 of the refraction-type camera module 900 disposed in an electronic device (e.g, 1300 in FIG. 13) is disposed may be referred to as a sensor package height 920. The sensor package height 920 of the refraction-type camera module 900 according to an embodiment may be a second sensor package height 922 smaller than a first sensor package height 921 of the camera module including the bracket formed using a single mold. That is, the sensor package height 920 according to an embodiment may be lowered by the sensor package height difference 923.

The height at which the light that has been incident on the lens module 901 in the refraction-type camera module 900 and passed through the prism 902 is incident on the sensor package 100 along the changed optical path may be referred to as the optical axis height 930 of the light. The optical axis height 930 of the light having passed through the prism 902, according to an embodiment, may be a second optical axis height 932 which is smaller than a first optical axis height 931 having passed through the prism of the camera module including a bracket formed using a single mold. That is, the optical axis height 930 of light, according to an embodiment, may be lowered by the optical axis height difference 933. For example, when the sensor package height 920 is lower than the sensor package height of the camera module including the bracket formed using a single mold due to the coupled plate (130 in FIG. 8), the optical axis height 930 of the light having passed through the prism 902 may also be lowered.

The overall height of the refraction-type camera module 900 disposed in the electronic device may be referred to as the lens module height 910. The lens module height 910 of the refraction-type camera module 900 according to an embodiment may be the second lens module height 912 which is smaller than the first lens module height 911 of the camera module including a bracket formed using a single mold. That is, the height at which the refraction-type camera module 900 according to an embodiment is exposed to the outside of the electronic device may be lowered by the lens module difference 913. According to another embodiment, when the sensor package height 920 is lowered, the optical axis height 930 of the light having passed through the prism 902 may be lowered, and when the optical axis height 930 of the light having passed through the prism 902 is lowered, the lens module height 910 may be lowered. Accordingly, it is possible to reduce the degree of protrusion of the lens module in the camera module to the outside of the device including the camera module.

Figure 10:
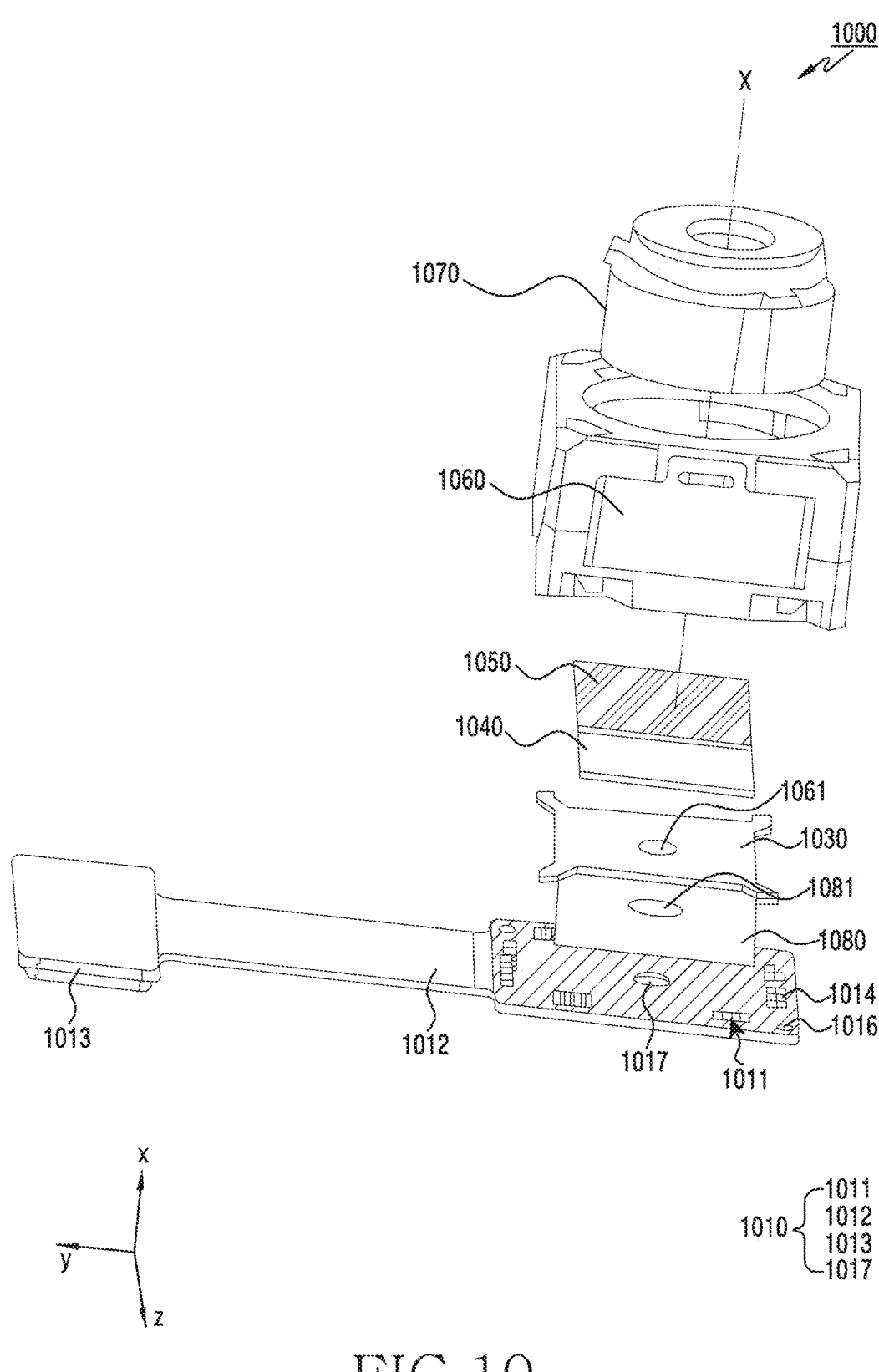
FIG. 10 is an exploded perspective view illustrating a direct-type camera module according to an embodiment.

FIG. 10 is an exploded perspective view illustrating a direct-type camera module 1000 according to an embodiment.

Referring to FIG. 10, an image sensor 1040 mounted on one end of a substrate 1010, an IR filter 1050, and a lens assembly 1070 may be mounted inside a housing 1060 of the direct camera module 1000.

Although not shown in the drawings, the sensor package (e.g., 100 in FIG. 1) may be disposed in an area in which the image sensor 1040 or the IR filter 1050 is disposed.

According to an embodiment, the substrate 1010 may include a substrate unit 1011, a connection unit 1012, and a connector unit 1013. The connector unit 1013 of the substrate 1010 may receive an electrical image signal generated by the image sensor 1040 mounted on the substrate unit 1011 through the connection unit 1012. The connector unit 1013 may be connected to an external circuit to provide an electrical image signal generated by the image sensor 1040 to an external circuit, for example, a main circuit board.

According to an embodiment, various electronic components may be mounted on the substrate unit 1011 of the substrate 1010. In an example, the substrate unit 1011 of the substrate 1010 may include a plurality of bonding pads 1014, a coupling hole 1016, and a ground unit 1017 which are formed on an upper surface of the substrate 1010. Each of the plurality of bonding pads 1014 may be electrically connected to the image sensor 1040 by a wire bonding method or the like. That is, the bonding pad 1014 may be sequentially electrically connected to the connection unit 1012 and the connector unit 1013 through a circuit layer in the substrate 1010. The coupling hole 1016 may provide assembly of the substrate unit 1011 and the housing 1060. For example, the housing 1060 may be fixedly coupled to the substrate unit 1011 by a coupling pin to be fastened to the coupling hole 1016. In addition, the housing 1060 may be fixedly coupled to the upper surface of the substrate 1011 by using an adhesive.

According to an embodiment, a fixing plate 1030 may be formed in a plate shape. The fixing plate 1030 may have a predetermined thickness to be formed to have a predetermined strength and hardness. Although the printed circuit board may be bent by an external impact due to the predetermined strength and hardness provided by the plate-shaped fixing plate 1030, the image sensor 1040 may be stably mounted on the substrate unit 1011 of the substrate 1010. That is, the predetermined strength and hardness provided by the coating layer 1015 and the fixing plate 1030 of the substrate unit 1011 may advantageously enable the image sensor 1040 to be stably mounted on the substrate unit 1011 so as to coincide with the lens assembly 1070 relative to the optical axis X.

According to an embodiment, the fixing plate 1030 may include a substantially rectangular plate shape. However, the fixing plate 1030 may have a size smaller than that of the substrate unit 1011 so as not to cover the bonding pad 1014 and the like on the substrate unit 1011. In addition, the fixing plate 1030 may include a protrusion formed on each of the corners thereof so as to contribute to the rigidity and hardness of the substrate unit 1011 formed as a printed circuit board without covering connection pads such as the bonding pad 1014 on the substrate unit 1011.

According to an embodiment, the fixing plate 1030 may be made of a conductive material. In one example, the fixing plate 1030 may be made of a metal material such as steel use stainless. For example, when the fixing plate 1030 is made of a steel use stainless material, the horizontal (e.g., y-axis width) and vertical (e.g., z-axis width) length of the direct-type camera module 1000 may be reduced.

Figure 11:
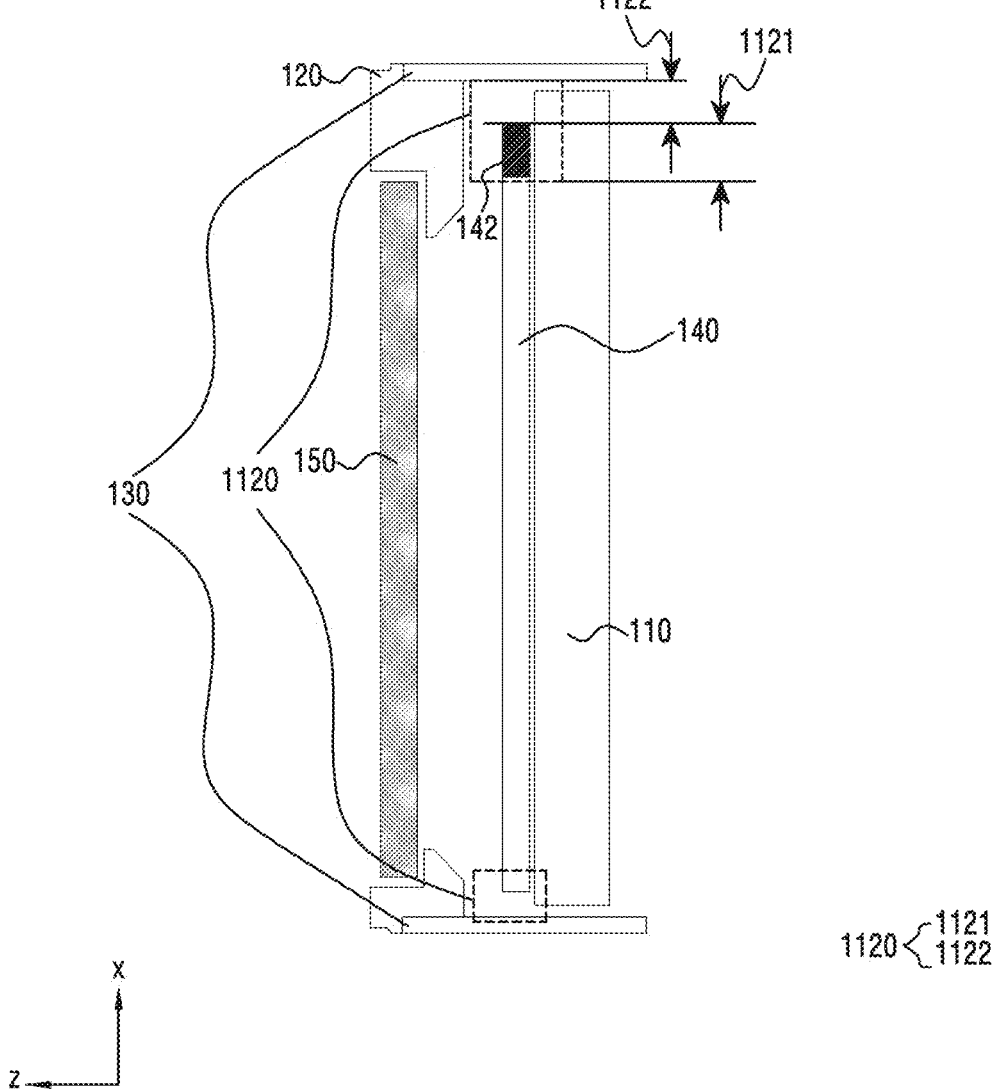
FIG. 11 is a side view of a camera module showing a space of a sensor pad mounted on a sensor package of the camera module of FIG. 1, according to an embodiment.

FIG. 11 is a cross-sectional view illustrating a space of a sensor pad mounted on the sensor package 100 of a camera module, according to an embodiment.

Referring to FIG. 11, the image sensor 140 and the bonding pad 142 may be disposed on the substrate 110. The sensor package 100 may include a plurality of bonding pads 142. The plurality of bonding pads 142 may be electrically connected to the image sensor 140 by a wire bonding method or the like. In addition, the bonding pad 142 may electrically connect the image sensor 140 to the substrate 110 and wiring in the substrate 110.

The bonding pad space 1120 may be referred to as a space in which the bonding pad 142 is mounted, except for a space in which the image sensor 140 is mounted on the substrate 110. When the number of wirings required by the image sensor 140 mounted on the substrate 110 increases, the required bonding pad space 1120 may be increased. For example, an additional bonding pad space 1120 capable of mounting the bonding pad 142 on the substrate 110 may be required when the image sensor 140 has three surfaces formed of the bonding pad 142 than when the image sensor 140 has two surfaces formed of the bonding pad 142.

According to an embodiment, the bonding pad space 1120 may additionally secure a second bonding pad space 1122 in a first bonding pad space 1121 of the sensor package including a bracket formed using a single mold. For example, in case of the same size of the image sensor 140, the bracket 120 by injection molding a bracket into a mold in a state in which the plated is inserted may secure the wider bonding pad space 1120, compared to the sensor package including a bracket formed using a single mold.

Figure 12:
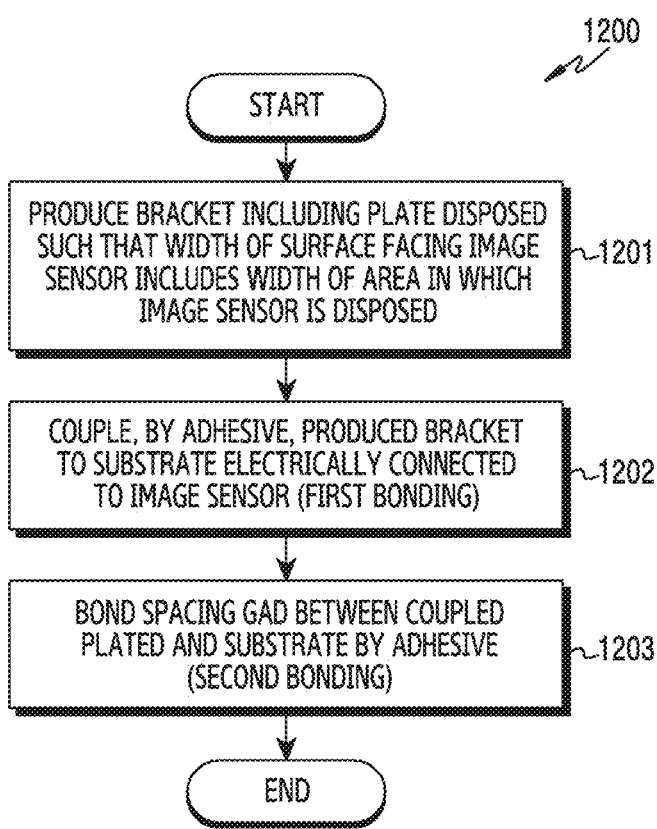
FIG. 12 is a flowchart illustrating a method for manufacturing a sensor package of a camera module according to an embodiment.

FIG. 12 is a flowchart 1200 illustrating a method for manufacturing a camera module according to an embodiment.

Referring to FIG. 12, the method for manufacturing a sensor package (100 in FIG. 1) of a camera module includes a first process 1201 of producing a bracket (120 in FIG. 1) including a plate (130 in FIG. 1) disposed such that the width (131 in FIG. 3) of the surface facing an image sensor (140 in FIG. 1) includes at least one of the width of an area (141 in FIG. 3) in which the image sensor is disposed and/or the width (151 in FIG. 3) of an area in which an IR filter (150 in FIG. 1) is disposed, a second process 1202 of bonding, by an adhesive, the produced bracket 120 to the substrate 100 electrically connected to the image sensor 140, and a third process 1203 of bonding a spacing gap between the coupled plate 130 and the substrate 110 by using an adhesive.

According to an embodiment, in the first process 1201, the bracket 120 may be formed by injection molding a material forming a bracket (120 in FIG. 1) in a state in which the plate (130 in FIG. 1) is inserted into a mold. In an example, the bracket 120 may include a material including a resin suitable for injection molding.

According to an embodiment, in the second process 1202, an adhesive may be applied to the first bonding area 321 to which the bracket 120 and the substrate 110 are bonded. In addition, in the second process 1202, an adhesive may be applied to the second bonding area 322 disposed to be spaced apart from the first bonding area 321. In an example, the adhesive may include an epoxy resin or a non-conductive adhesive. In another example, the coupling may be performed using a conductive adhesive. For example, the conductive adhesive may include silver-epoxy or solder paste.

According to an embodiment, the third process 1203 may include applying an adhesive to the third bonding area 400 while the substrate 110 is placed on the bracket 120. The spacing gap between the plate 130 and the substrate 110 may be bonded by an adhesive applied to the third bonding area 400. For example, the image sensor 140 on the substrate 110 may be shielded from the outside through the third process 1203.

Figure 13:
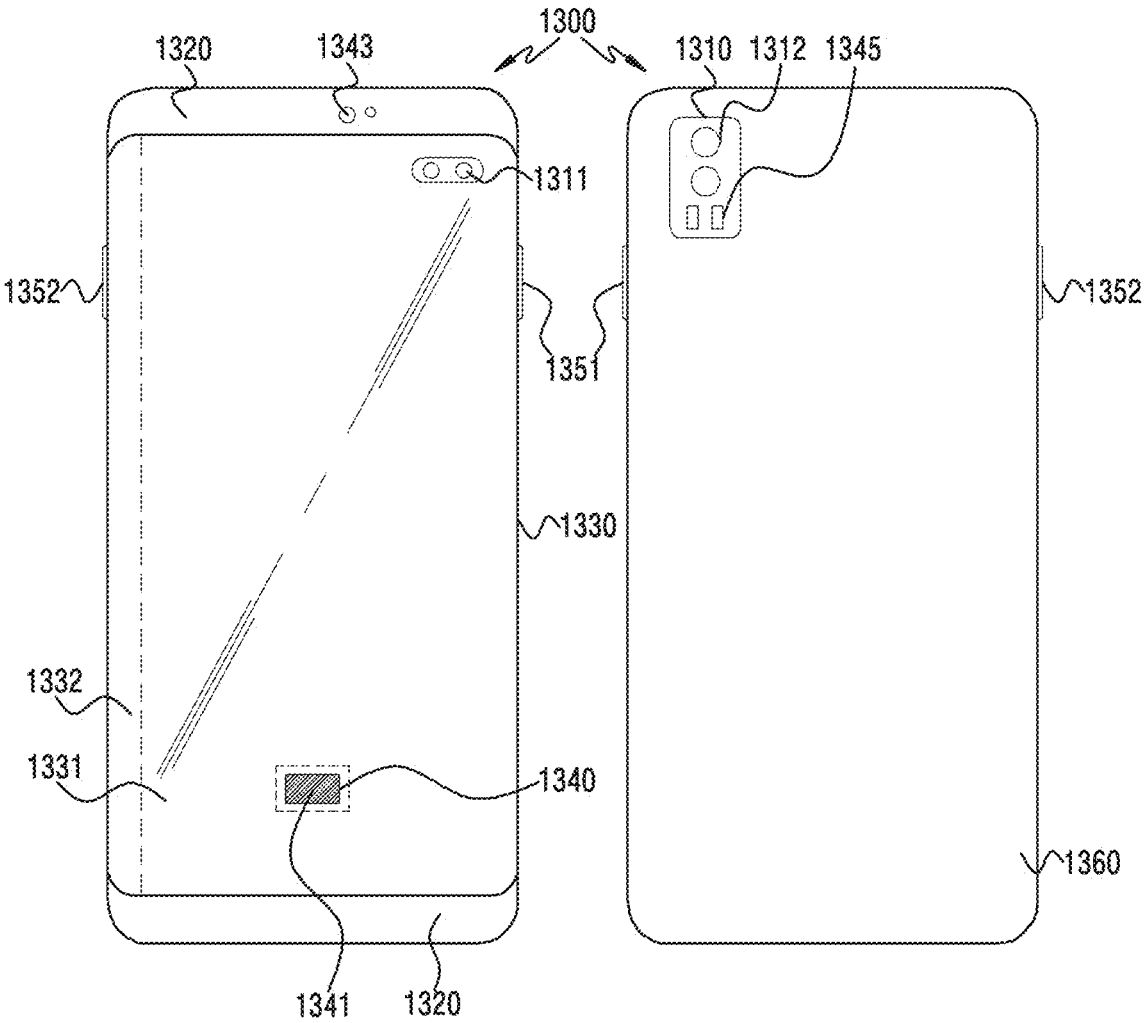
FIG. 13 is a plan view illustrating an electronic device including a camera module according to an embodiment.

FIG. 13 illustrates an example of an electronic device 1300 that may include a camera module according to an embodiment.

Referring to FIG. 13, a display 1330 may be disposed on the front surface of the electronic device 1300 according to an embodiment. In an embodiment, the display 1330 may occupy most of the front surface of the electronic device 1300. A display 1330 and an area of a bezel 1320 surrounding at least partial edge of the display 1330 may be disposed on the front surface of the electronic device 1300. In the example of FIG. 13, the display 1330 may include a flat area 1331 and a curved area 1332 extending from the flat area 1331 toward the lateral surface of the electronic device 1300. Although the curved area 1332 is shown only on one side (e.g., the left side) in FIG. 13, it may be understood that the same curved area is also formed on the opposite side. In addition, the electronic device 1300 illustrated in FIG. 13 is an example, and various embodiments are possible. For example, the display 1330 of the electronic device 1300 may include only the flat area 1331 without the curved area 1332, or may include the curved area 1332 only at the edge of one side rather than both sides. In addition, according to an embodiment, the curved area 1332 may extend to the rear surface of the electronic device 1300, so that the electronic device 1300 may include an additional planar area.

In an embodiment, a fingerprint sensor 1341 for recognizing a user's fingerprint may be included in the first area 1340 of the display 1330. The fingerprint sensor 1341 may be disposed on a layer below the display 1330, and thus the fingerprint sensor 1341 may not be visually recognized by a user or it may be difficult for the user to visually recognize the same. In addition, an additional sensor for user/biometric authentication in addition to the fingerprint sensor 1341 may be disposed in a partial area of the display 1330. In another embodiment, the sensor for user/biometric authentication may be disposed in one area of the bezel 1320. For example, an IR sensor for iris authentication may be exposed through one area of the display 1330 or exposed through one area of the bezel 1320.

In an embodiment, a front camera 1311 may be disposed on the front surface of the electronic device 1300. In the embodiment of FIG. 1, the front camera 1311 is shown to be exposed through one area of the display 1330, but in another embodiment, the front camera 1311 may be exposed through the bezel 1320.

In an embodiment, the electronic device 1300 may include one or more front cameras 1311. For example, the electronic device 1300 may include two front cameras, such as a first front camera and a second front camera. In an embodiment, the first front camera and the second front camera may be the same type of camera having the same specification (e.g., a pixel), but the first front camera and the second front camera may be implemented as cameras of different specifications. The electronic device 1300 may support a function (e.g., 3D imaging, auto focus, etc.) related to a dual camera through two front cameras.

In an embodiment, a rear camera 1312 may be disposed on the rear surface of the electronic device 1300. The rear camera 1312 may be exposed through the camera area 1310 on a rear cover 1360.

In an embodiment, the electronic device 1300 may include a plurality of rear cameras disposed in the camera area 1310. For example, the electronic device 1300 may include two or more rear cameras. For example, the electronic device 1300 may include a first rear camera, a second rear camera, and a third rear camera. The first rear camera, the second rear camera, and the third rear camera may have different specifications. For example, the first rear camera and the second rear camera and/or the third rear camera may be different from each other in terms of FOV, pixel, aperture, and optical zoom/digital zoom support, image stabilizing function support, the type and arrangement of the lens set included in each camera, and the like. For example, the first rear camera may be a general camera, the second rear camera may be a camera for wide shooting, and the third rear camera may be a camera for telephoto shooting.

In this document, descriptions of functions or features of the front camera may be applied to the rear camera, and vice versa.

In an embodiment, various hardware or sensors that assist photographing, such as a flash 1345, may be additionally disposed in the camera area 1310. For example, a distance sensor (e.g., a TOF sensor) for detecting a distance between a subject and the electronic device 1300 may be further included.

In an embodiment, at least one physical key may be disposed on a lateral part of the electronic device 1300. For example, a first function key 1351 for turning on/off the display 1330 or turning on/off the power of the electronic device 1300 may be disposed on the right edge with respect to the front surface of the electronic device 1300. In an embodiment, a second function key 1352 for controlling the volume or screen brightness of the electronic device 1300 may be disposed on the left edge with respect to the front surface of the electronic device 1300. In addition to this, additional buttons or keys may be disposed on the front surface or the rear surface of the electronic device 1300. For example, a physical button or a touch button mapped to a specific function may be disposed in a lower area of the front bezel 1320.

The electronic device 1300 illustrated in FIG. 13 corresponds to one example, and the form of a device to which the technical idea disclosed in this document is applied is not limited. The technical idea disclosed in this document is applicable to various user devices including a first camera module facing a first direction, and a second camera module facing a direction different from the first direction. For example, the technical idea disclosed in this document may be applied to a tablet, a notebook computer, or a foldable electronic device that may be folded in the horizontal direction or be foldable in the vertical direction by adopting the flexible display 1330 and a hinge structure. In addition, the technical idea may be applied even when it is possible to arrange a first camera module and a second camera module which face the same direction to face different directions through rotation, folding, or deformation of a device.

Since many features are optional only, the features of the preferred embodiments have been described in connection with "may". Nevertheless, said preferred embodiments have to understood to be disclosed as specific preferred combinations as shown in the drawings and therefore features shown in the drawings are to be understood as a real preferred combination for the present invention which however does not restrict the scope of the invention.

According to various embodiments, a camera module (e.g., the camera module 100 in FIG. 1) may include: an image sensor (e.g., the image sensor 140 in FIGS. 1 and 3); a substrate (e.g., the substrate 110 of FIG. 1) electrically connected to the image sensor; a bracket (e.g., the bracket 120 in FIG. 1) configured to fix the substrate; and a plate (e.g., the plate 130 in FIG. 1) disposed on the bracket such that the width (e.g., 151 in FIG. 3) of a surface of the plate facing the image sensor comprises the width (e.g., 141 in FIG. 3) of an area in which the image sensor is disposed, thereby shielding at least a part of a space in which the image sensor is disposed from the outside.

According to an embodiment, the bracket may include a first bonding area bonded to the substrate, and a second bonding area spaced apart from the first bonding area, and the plate may be disposed between the first bonding area and the second bonding area.

According to an embodiment, the camera module may further include an IR filter disposed on the bracket.

According to an embodiment, the image sensor may be disposed in a space formed by the bracket, the IR filter, the plate, and the substrate.

According to an embodiment, the camera module may include a first surface on which the IR filter is disposed, a second surface on which the substrate is disposed, and a lateral surface formed between the first surface and the second surface, wherein the lateral surface may include a first lateral surface forming the first bonding area, a second lateral surface forming the second bonding area at a position opposite to the first bonding area, and a third lateral surface formed by the plate.

According to an embodiment, the substrate may include at least one groove shape formed to be disposed between the plate and the substrate.

According to an embodiment, the groove shape may further include a curved shape such that at least a partial area is away from the plate.

According to an embodiment, the curved shape may be formed at a position where one end of the plate is disposed.

According to an embodiment, the camera module may include an adhesive applied to the groove shape such that the substrate is coupled to at least one of the bracket or the plate, wherein the bracket may be bonded to the substrate by the adhesive applied to the groove shape.

According to an embodiment, the bracket may be formed integrally with the plate by insert injection molding.

According to an embodiment, the plate may include a steel use stainless (SUS) material.

According to an embodiment, the second bonding area may shield, by an adhesive, at least a part of a space in which the image sensor is disposed.

According to various embodiments, a method for manufacturing a camera module may include: producing a bracket including a plate disposed such that the width of a surface of the plate facing an image sensor includes the width of an area in which the image sensor is disposed (e.g., the bracket producing operation 1201 in FIG. 12); first bonding in which the produced bracket and a substrate electrically connected to the image sensor are coupled to each other by an adhesive (e.g., the first bonding operation 1202 in FIG. 12); and second bonding in which a spacing gap between the coupled plate and the substrate is bonded by an adhesive (e.g., the second bonding operation 1203 in FIG. 12).

According to an embodiment, the producing of the bracket may include forming the bracket by injection molding a material forming the bracket in a state in which the plate is inserted into a mold.

According to an embodiment, the first bonding may include applying an adhesive to the first bonding area to which the bracket and the substrate are bonded.

According to an embodiment, the second bonding may include applying an adhesive to the second bonding area spaced apart from the first bonding area.

According to various embodiments, the electronic device (e.g., the electronic device 1300 in FIG. 13) may include a housing (e.g., the housing 1060 in FIG. 10) configured to form an inner space, at least one electronic component disposed in the inner space, and a camera module disposed in the inner space, wherein the camera module may include an image sensor, a substrate electrically connected to the image sensor; a bracket configured to fix the substrate, and a plate disposed on the bracket such that the width of a surface of the plate facing the image sensor includes the width of an area in which the image sensor is disposed, thereby shielding at least a part of a space in which the image sensor is disposed from the outside.

According to an embodiment, the electronic device may further include an IR filter disposed on the bracket.

According to an embodiment, the bracket may include a first bonding area bonded to the substrate, and a second bonding area spaced apart from the first bonding area, and the plate may be disposed between the first bonding area and the second bonding area.

According to an embodiment, an electronic device may include: a first surface on which the IR filter is disposed; a second surface on which the substrate is disposed; and a lateral surface formed between the first surface and the second surface, wherein the lateral surface may include: a first lateral surface forming the first bonding area; a second lateral surface forming the second bonding area at a position opposite to the first bonding area; and a third lateral surface formed by the plate.

According to an embodiment, the substrate may include at least one groove shape formed to be disposed between the plate and the substrate, wherein the groove shape may include a curved shape such that at least a partial area thereof is away from the plate.

What is claimed is:
1. A camera module comprising:
an image sensor;
a substrate electrically connected to the image sensor;
a bracket configured to fix the substrate; and a plate disposed on the bracket and along at least a part of an edge of the substrate such that a height of a surface of the plate facing the image sensor covers a width of an area in which the image sensor is disposed when viewed from a side of the camera module, the plate shielding at least a part of a space in which the image sensor is disposed from the outside, wherein the plate is disposed in a cut-out in the bracket.

2. The camera module of claim 1, wherein the bracket comprises a first bonding area bonded to the substrate, and a second bonding area spaced apart from the first bonding area, and wherein the plate is disposed between the first bonding area and the second bonding area.

3. The camera module of claim 2, further comprising an IR filter disposed on the bracket.

4. The camera module of claim 3, wherein the image sensor is disposed in a space formed by the bracket, the IR filter, the plate, and the substrate.

5. The camera module of claim 3, comprising a first surface on which the IR filter is disposed, a second surface on which the substrate is disposed, and a lateral surface formed between the first surface and the second surface, wherein the lateral surface comprises a first lateral surface forming the first bonding area, a second lateral surface forming the second bonding area at a position opposite to the first bonding area, and a third lateral surface formed by the plate.

6. The camera module of claim 1, wherein the substrate comprises at least one groove shape formed to be disposed between the plate and the substrate.

7. The camera module of claim 6, wherein the groove shape comprises a curved shape such that at least a partial area is away from the plate.

8. The camera module of claim 7, wherein the curved shape is formed at a position where one end of the plate is disposed.

9. The camera module of claim 6, comprising an adhesive applied to the groove shape such that the substrate is coupled to at least one of the bracket or the plate, wherein the bracket is coupled to the substrate by the adhesive applied to the groove shape.

10. The camera module of claim 1, wherein the bracket is formed integrally with the plate by insert injection molding, and wherein the plate comprises a steel use stainless (SUS) material.

11. The camera module of claim 2, wherein the second bonding area shields, by an adhesive, at least a part of a space in which the image sensor is disposed.

12. A method for manufacturing a camera module, the method comprising:

producing a bracket supporting a plate disposed such that a height of a surface of the plate facing an image sensor covers a width of an area in which the image sensor is disposed when viewed from a side of the camera module, the plate shielding at least a part of a space of the camera module in which the image sensor is disposed from the outside;

first bonding in which the produced bracket and a substrate electrically connected to the image sensor are coupled to each other by an adhesive; and second bonding in which the coupled plate and the substrate are coupled to each other and along at least a part of an edge of the substrate by applying an adhesive into a spacing gap therebetween, wherein the plate is disposed in a cut-out in the bracket.

13. The method of claim 12, wherein the producing of the bracket comprises forming the bracket by injection molding a material forming the bracket in a state in which the plate is inserted into a mold.

14. The method of claim 12, wherein the first bonding comprises applying an adhesive to the first bonding area to which the bracket and the substrate are bonded, and the second bonding comprises applying an adhesive to the second bonding area spaced apart from the first bonding area.

15. An electronic device comprising:

a housing configured to form an inner space;

at least one electronic component disposed in the inner space; and a camera module disposed in the inner space, wherein the camera module comprises:

an image sensor;

a substrate electrically connected to the image sensor;

a bracket configured to fix the substrate; and a plate disposed on the bracket and along at least a part of an edge of the substrate such that a height of a surface of the plate facing the image sensor covers a width of an area in which the image sensor is disposed when viewed from a side of the camera module, the plate shielding at least a part of a space in which the image sensor is disposed from the outside, wherein the plate is disposed in a cut-out in the bracket.

16. The electronic device of claim 15, wherein the bracket comprises a first bonding area bonded to the substrate, and a second bonding area spaced apart from the first bonding area, and wherein the plate is disposed between the first bonding area and the second bonding area.

17. The electronic device of claim 16, further comprising an IR filter disposed on the bracket.

18. The electronic device of claim 17, wherein the image sensor is disposed in a space formed by the bracket, the IR filter, the plate, and the substrate.

19. The electronic device of claim 17, comprising a first surface on which the IR filter is disposed, a second surface on which the substrate is disposed, and a lateral surface formed between the first surface and the second surface, wherein the lateral surface comprises a first lateral surface forming the first bonding area, a second lateral surface forming the second bonding area at a position opposite to the first bonding area, and a third lateral surface formed by the plate.

* * * * *